United States Patent [19]
Edson et al.

[11] Patent Number: 5,927,627
[45] Date of Patent: Jul. 27, 1999

[54] CONTINUOUS CRUMBING MACHINE FOR RECYCLING RUBBER TIRES

[75] Inventors: Gerald E. Edson, Terre Haute; William F. Brown, Elizabethtown; Paul G. Thomson, Terre Haute, all of Ind.

[73] Assignee: Honey Creek Industries, Inc., Terre Haute, Ind.

[21] Appl. No.: 08/658,324

[22] Filed: Jun. 5, 1996

[51] Int. Cl.[6] ..................................................... B02C 4/08
[52] U.S. Cl. .................... 241/159; 241/236; 241/293; 241/DIG. 31
[58] Field of Search .................. 492/31, 36; 241/236, 241/DIG. 31, 293, 159

[56] References Cited

U.S. PATENT DOCUMENTS 3,843,061  10/1974  Hammelmann .
4,235,383  11/1980  Clark .
4,614,308  9/1986  Barclay .
4,757,949  7/1988  Horton .

Primary Examiner—Mark Rosenbaum
Attorney, Agent, or Firm—H. John Barnett

[57] ABSTRACT

An improved continuous crumbing machine for recycling rubber tires and other materials such as polyethylene containers, gypsum, hardboard, tin cans, glass jars and bottles. The device comprises a pair of rotating rolls having negative rake teeth of interlocking sprocket design formed on the outer periphery of each roll. The materials to be fragmented or crumbed are fed between pairs of rotating rollers having negative rake teeth. A plurality of stages of rotating rollers are placed in series to obtain the desired particle size.

8 Claims, 5 Drawing Sheets

CONTINUOUS CRUMBING MACHINE FOR RECYCLING RUBBER TIRES

BACKGROUND OF THE INVENTION

1. Field of the Invention

This invention is directed to an improved continuous crumbing machine for recycling rubber tires and other materials such as polyethylene containers, gypsum, hardboard, tin cans, glass jars and bottles. The device comprises a pair of rotating rolls having negative rake teeth of interlocking sprocket design formed on the outer periphery of each roll. The materials to be fragmented or crumbed are fed between pairs of rotating rollers having negative rake teeth. A plurality of stages of rotating rollers are placed in series to obtain the desired particle size.

2. Description of the Related Art

The following patents are directed to the crumbing and shredding of rubber tires:

| Patent Number | Inventor | Date |
| --- | --- | --- |
| 3,843,061 | Hammelmann | 1974 |
| 4,235,383 | Clark | 1980 |
| 4,614,308 | Barclay | 1986 |
| 4,757,949 | Horton | 1988. |

Barclay & Horton are directed to continuous processes. Barclay employs a plurality of stator blades which intermesh with rotor blades mounted on a central, vertical shaft. The Barclay device is massive, the rotors being about 48 inches in diameter (See Col. 7, lines 16–30 of the Barclay patent).

Horton has transversely disposed cutter wheels on adjacent parallel horizontal shafts. The shafts rotate at different speeds ranging from about 20–34 RPM for the first shaft, and about 26–42 RPM for the second shaft, the speed of the second shaft being about 6 RPM faster.

Horton appears to be the closest reference, but Horton employs cutter wheels instead of negative rake teeth integrally formed into rotating rolls, as in the subject invention. Horton's differential RPM ratio is never as great as the subject invention, which may range from 4:1 to 25:1. Horton obtains particle sizes of one to two inches, and does not mention steel wire removal. In addition, Horton employs cutter wheels instead of negative rake teeth.

Hammelmann's apparatus receives successive tires, stretches them and subjects the tires to a high speed water jet. Clark employs abrasive, counterrotating wheels to disintegrate a tire which is fed into the nip between the wheels in an upright position.

SUMMARY OF THE INVENTION

This invention comprises an improved continuous crumbing machine for recycling rubber tires, including steel-belted ones, and other materials, such as polyethylene containers, gypsum, hardboard, tin cans and glass containers. The apparatus is capable of taking a steel-belted tire from its original configuration down to its component parts. The wire in the steel belts is substantially completely separated from the rubber "crumbs", which are typically 40 mesh or smaller at the finish of the process.

The apparatus of the instant invention substantially removes the steel wire from steel belted tires and produces a fine, granular crumb material in the range of about 40 mesh or less, which is entirely suitable for making various recycled products, including membranes on landfills, rubber conduits, bed liners, floats for nautical use, and various formed objects.

The apparatus of the invention preferably comprises a plurality of pairs of heavy rollers (about 12–20" diameter) which are disposed horizontally adjacent to each other, and which rotate downwardly and inwardly towards each other. The opposed roller surfaces have integral, negative rake teeth which intermesh along the length of the rollers so that an incoming object is gripped, compressed and torn apart by the rollers.

The opposed rollers rotate at different speeds in the ratio of 4:1 to 25:1 RPM to further increase the tearing and comminuting action as the incoming object is fed down into the nip of the opposing rollers. The rollers are driven by a drive system capable of developing 100,000 to 5,000,000 inch lbs. of torque at the nip between the rollers determined by the size of the rollers, and the material being comminuted.

A second and third tier of similar opposed roller pairs are normally disposed below the first tier to receive the partially crumbed material and to comminute it further. The second and third tiers of roller pairs are capable of comminuting (crumbing) a steel belted rubber tire down to 40 mesh or less in particle size, and to substantially completely separate the steel wire from the rubber crumb.

A magnetic separator is used to remove all steel particles from the finely powdered crumb. The rubber crumb is then used to make various recycle products, such as rubber membranes for landfills, rubber conduits, bed liners, floats for nautical use and formed objects. In addition to crumbing steel-belted tires, the apparatus may be used to disintegrate and comminute polyethylene containers, gypsum, hardboard, tin cans, glass jars and bottles.

DETAILED DESCRIPTION OF THE INVENTION

Figure 1:
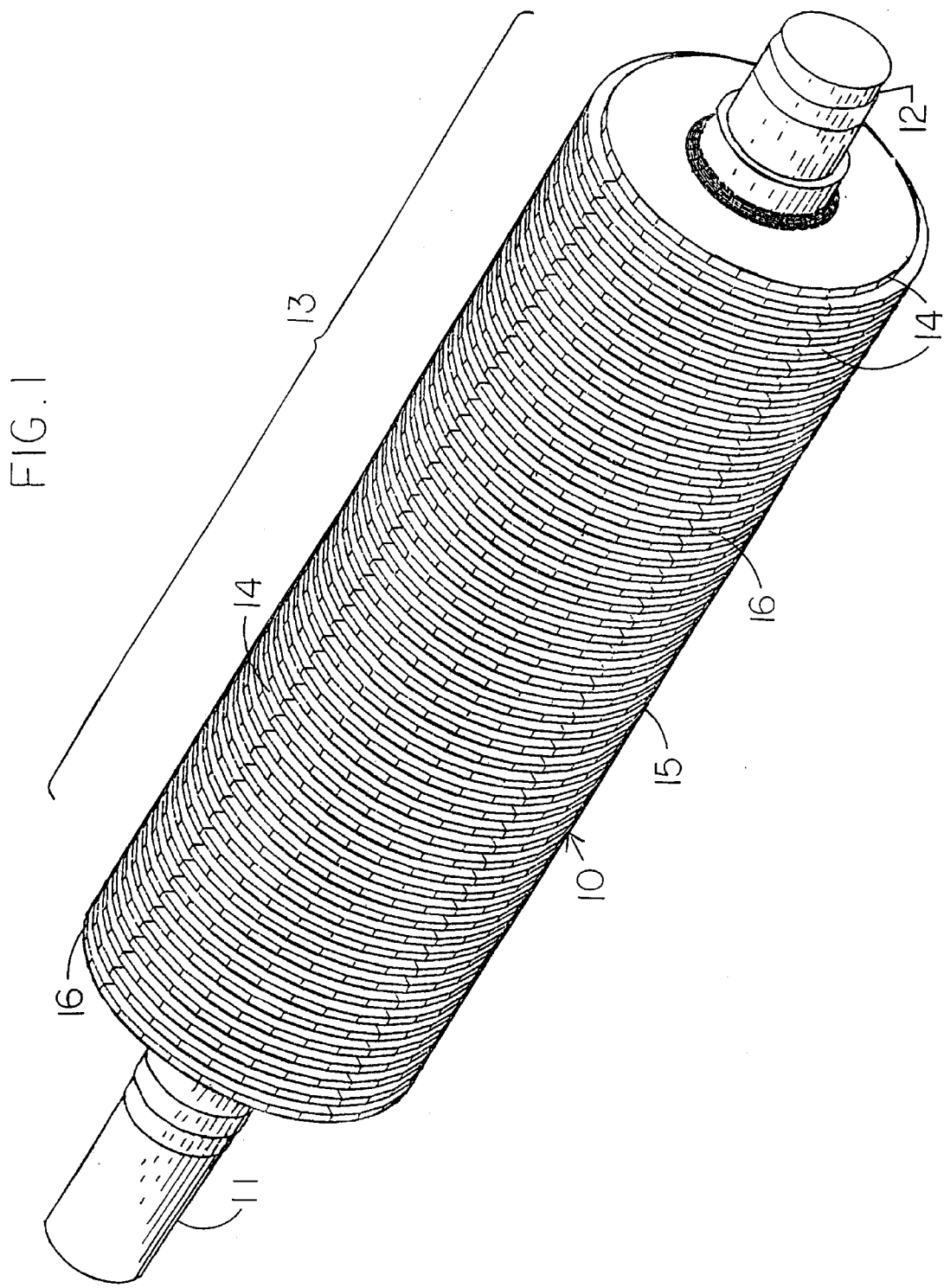
FIG. 1 of the drawings is a perspective view of one of the crumbing rollers having integral grooves, but prior to machining the integral teeth on it.

As shown in FIG. 1, crumb rollers 10 each have an integral drive axle 11, and a shorter, integral support axle 12. The cylindrical body 13 of each crumb roller 10 is shown in an intermediate stage of manufacture, in which a plurality of transverse, integral grooves 14 have been machined on the peripheral surface 15 of the crumb roller 10 to define ridges 16.

Figure 2:
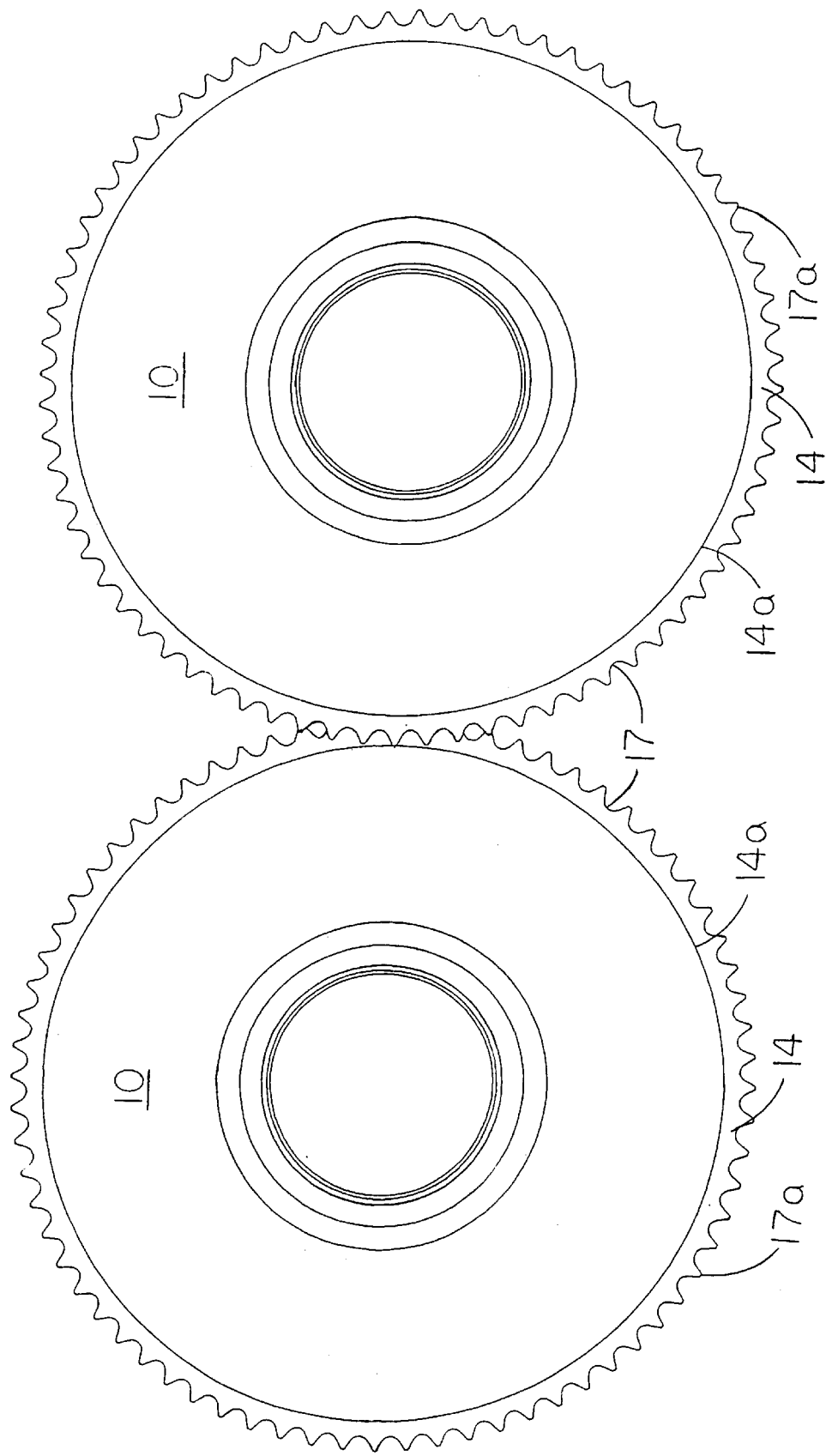
FIG. 2 is an enlarged, schematic end view of two intermeshing crumb rollers.

Intermeshing, integral teeth 17 are machined into the ridges 16, as shown in FIG. 2. Crumb rollers 10 are disposed horizontally parallel to each other so that the integral teeth 17 of one roller 10 are disposed in the grooves 14 of the opposing roller 10. The rollers 10 are disposed more closely together than is shown in FIG. 2 for optimum crumbing action. The preferred clearance between outer tips 17a of teeth 17 and bottom 14a of groove 14 is about 0.001 to 0.250 inch, with the clearance being adjustable for different materials.

Figure 3:
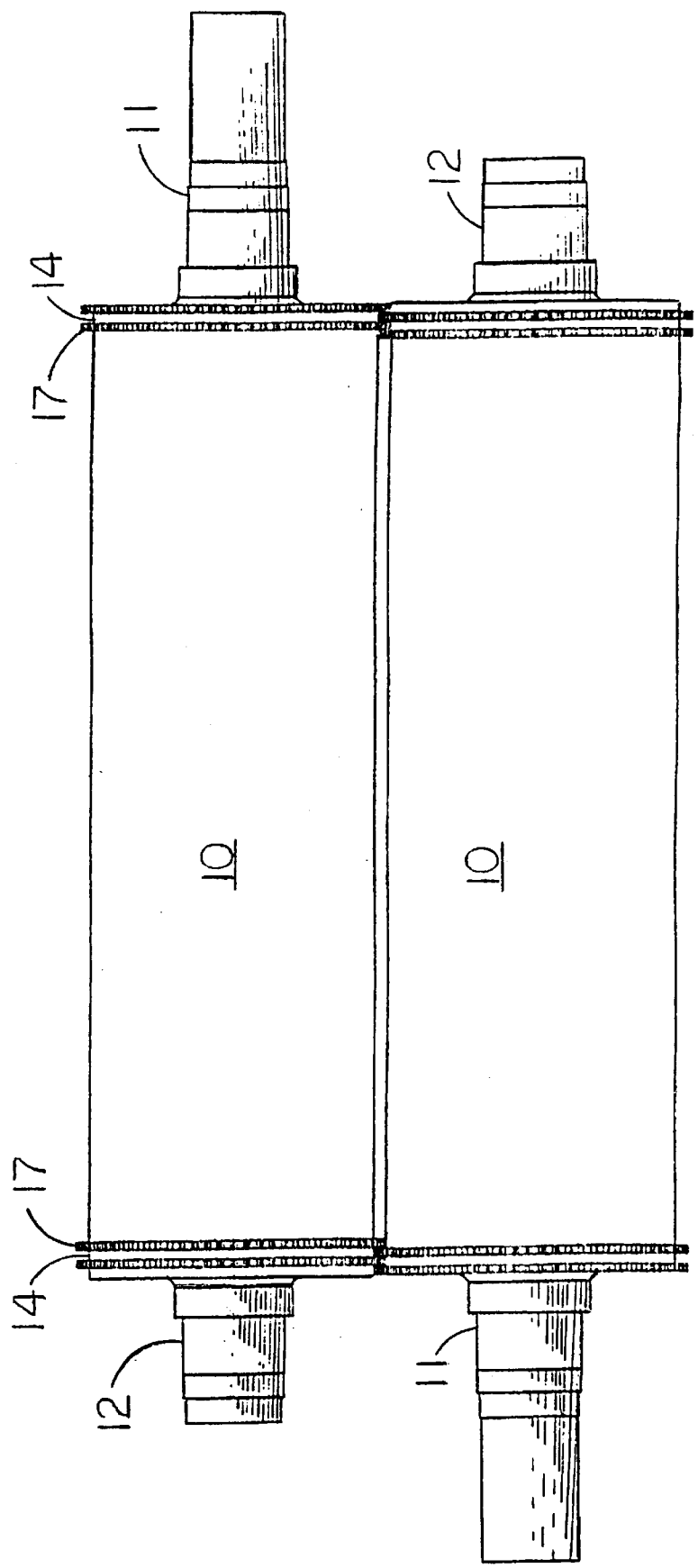
FIG. 3 is a schematic, top plan view of a pair of intermeshed crumb rollers with the intermediate, intermeshing teeth and grooves omitted.

FIG. 3 shows only some of the grooves 14 and the ridges 16 which carry the teeth 17. The grooves 14, ridges 16 and teeth 17 extend along the complete length of each roller 10. The drive axle 11 are disposed at opposite ends of the assembled pair of crumb rollers 10 to simplify space requirements for the respective independent drives.

Rollers 10 are typically about 12–20 inches in diameter in a typical three-stage crumbing machine for crumbing steel belted tires. The diameter of the rollers 10 is determined by the particular material to be disintegrated. Rollers 10 rotate downwardly and inwardly towards each other. The opposing rollers 10 are independently driven to rotate at different speeds, preferably in the range of speed ratios from 5:1 to 25:1. The rotational speed differential greatly enhances the crumbing action, and makes possible the complete separation of the steel belting wire material from the rubber of the steel-belted tires.

Each crumb roller 10 can be manufactured from a single, solid steel core, and the grooves 14 and teeth 17 may be machined integrally on the outer, peripheral surface 15 of the core body 13. It is important that the finished crumb roller 10 have a Rockwell hardness in the range of 50–70 in order to have significant useful life and wear in the crumbing operation to make the apparatus economically feasible for recycling typical waste materials, such as steel belted tires, polyethylene containers, gypsum, hardboard, tin cans, glass jars and bottles.

The crumb rollers 10 are preferably made from high alloy steels and tool steels, such as AISI A2 and M2. More specifically, AISI Steels #4140, 4150 and 4340 have been used. AISI # 4340 is presently preferred for tire crumbing apparatus. The crumb rollers are heat treated to obtain a Rockwell hardness of 50–70.

For certain comminuting applications, the crumbing rollers 10 can be made of a ceramic material. The important requirement is that the crumbing rollers 10 be harder than the material being comminuted.

A typical crumb roller 10 used for crumbing steel-belted tires has grooves 14 which are about 0.455 inches wide and about 1/12 inches deep. The teeth 17 are about 0.375 inches wide. The outer diameter of these crumb rollers 10 are about 9.6 inches, and their length is about 33–40 inches, not including the axles 11 and 12.

Figure 4:
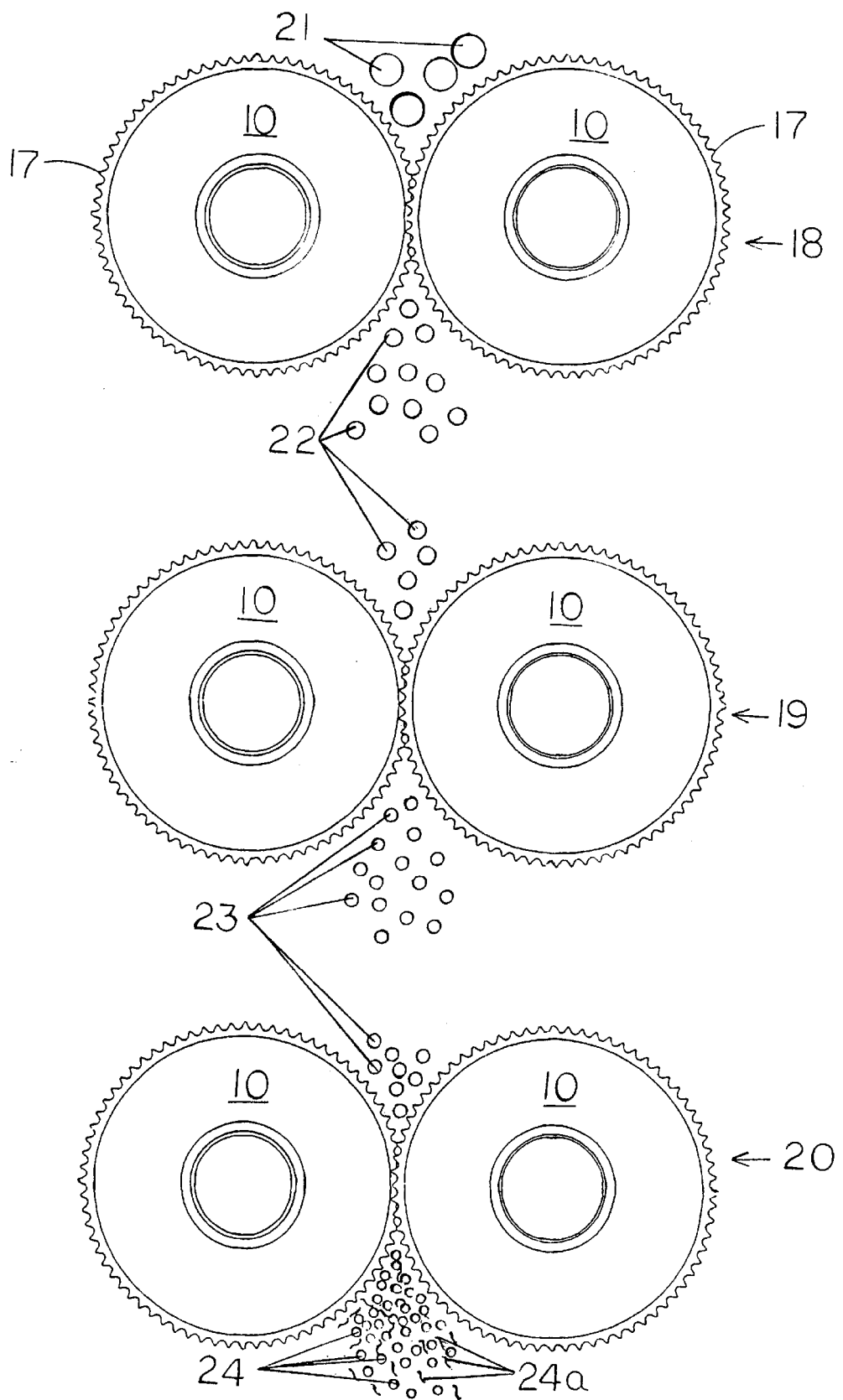
FIG. 4 is a schematic end view of a three stage crumbing machine with parts omitted.

As shown in FIG. 4, the crumb rollers 10 are typically arranged in horizontally disposed stages 18, 19 and 20, each stage comprising a pair of horizontally disposed, closely intermeshing crumb rollers 10. Material to be crumbed, such as steel-belted tires, or tire fragments 21, is fed into stage 18 to produce a first stage crumb 22, which drops by gravity into the nip between crumb rollers 10 of second stage 19. Second stage 19 produces a second stage, finer crumb 23 which falls by gravity into the nip between the crumb rollers 10 of the third stage 20. Third stage 20 produces a final stage powdered crumb 24, substantially completely separate from steel wire 24a. Steel wire 24a can then be removed from the powdered crumb product 24 by means of a magnetic separator (not shown).

Figure 5:
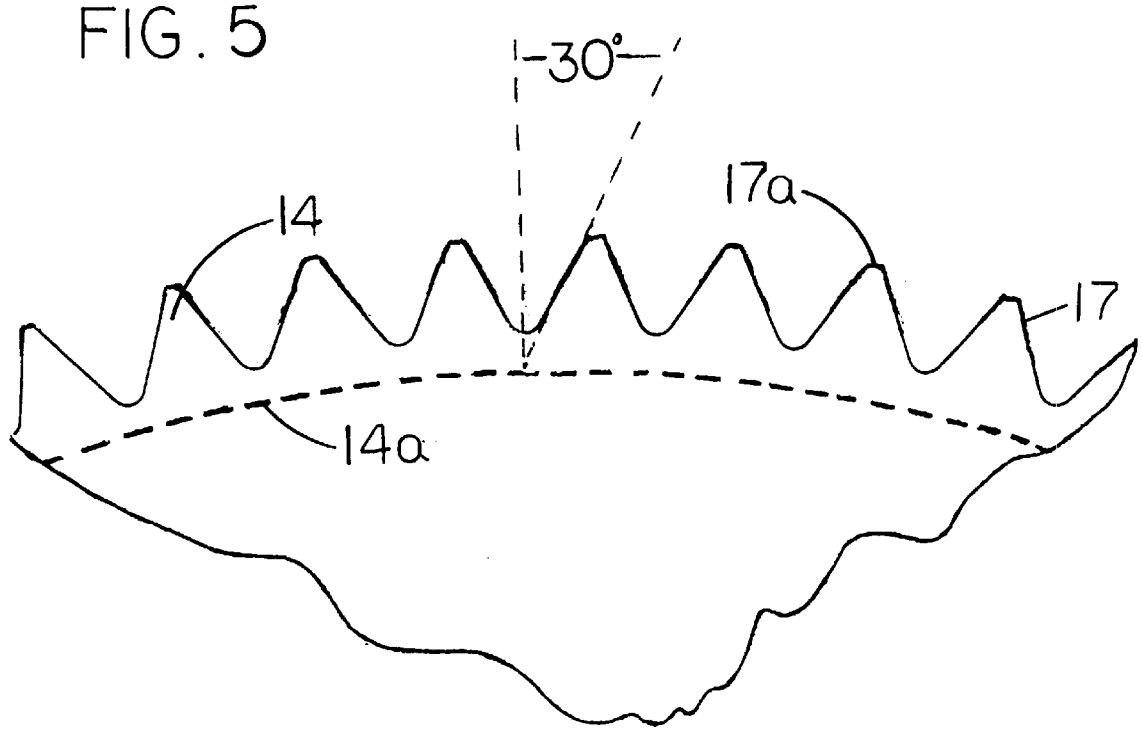
FIG. 5 is an enlarged schematic end view showing the profile of the negative rake teeth on the periphery of the crumb rollers.

As can best be seen in FIG. 5, an important feature of this invention is the negative rake teeth 17. It has been discovered that a rake of about 30 degrees measured between the radius of the roller and the transverse side surfaces of each of the teeth 17. The negative rake teeth 17, in combination with the differential rotational rates of the pairs of crumbing rollers 10, insures optimum crumbing action for tires, or tire fragments 21, first stage crumb 22, and second stage crumb 23, to produce a finely powdered crumb 24, from which all the steel wire 24a can be removed, as by magnetic separation.

In a typical first stage 18, the crumb rollers 10 have about 40–72 teeth, equally spaced around the circumference of a 10–12 inch diameter roller 10. About 60 teeth around the periphery of the first stage roller 10 is preferable. Side clearances between the teeth 17 of the opposing first stage rollers 10 is about 0.050 inch, and the diametrical clearance between teeth 17 and the opposing groove 14 of the opposing roller 10 is about 0.060 inch. The width of the teeth 17 in the first stage 18 is preferably about 0.355 inch for a roller 10 about 30 inches long.

For the typical second stage 19, the crumb rollers 10 also have 40–72 teeth 17 around the periphery of a 10–12 inch diameter roller 10, and about 60 teeth 17 around the second stage roller 10 is again preferred. Side clearance between the opposing teeth 17 of the opposing rollers 10 in the second stage 19 is reduced to about 0.040 inch, and the clearance between the teeth 17 and the opposing groove 14 is reduced to about 0.050 inch. The teeth 17 have a width of 0.355 inch, as in the first stage 18.

The crumb rollers 10 in the typical third stage 20 have about 60 to 90 teeth around the circumference of the third stage rollers 10, which are about 10–12 inches in diameter. At present, when the third stage rollers 10 are 12 inches in diameter, 72 teeth 17 around the periphery of the roller 10 is preferred. Teeth width for the third stage crumb rollers 10 is preferably about 0.310 inch, which is less than in the first two stages 18 and 19. The side clearances between the opposing teeth 17 of the third stage rollers 10 is also reduced, being about 0.025 inch. The clearance between the teeth 17 and the grooves 14 of the opposing roller 10 in the third stage 20 is in the range of 0.015 to 0.045 inch, and is preferably about 0.035 inch, which is less than the same clearance in the preceding stages 18 and 19.

The left and right crumb rollers 10 in each stage 18,19 and 20 are each provided with an independent drive motor (not shown) to drive the rollers 10 in all the stages 18, 19 and 20 of the crumbing machine through their respective drive axles 11. Reduction gears can be provided so that the rate of rotation of each roller 10 can be adjusted as required.

The drive motor for the left (slow speed) side of stages 18, 19 and 20 may be an A. C. electric motor capable of driving the left set of drive axles 11 and their respective rollers 10 in stages 18, 19 and 20 to develop a torque of 100,000 to 5,000,000 inch pounds under load. The drive motor for the right (high speed) side drive axles 11 may be a D. C. electric motor, and is connected to drive the right set of drive axles 11 of the right 1–5 set of rollers 10 to develop a torque of 100,000 to 5,000,000 inch pounds, also.

Controls (not shown) for the drive motors enable the operator of the apparatus to adjust the rotational speeds of the left set of rollers 10 in the stages 18, 19 and 20 separately from the rotational speeds of the right set of rollers 10 in stages 18, 19 and 20 to obtain a rotational differential between the right and left sets of rollers 10 ranging from 4:1 to 25:1.

Hydraulic drive motors (not shown) can also be used for either the left or the right side crumb rollers 10 in each stage 18, 19 and 20. In fact, any combination of hydraulic, diesel, AC, and D.C. drives may be used, so long as the RPM and torque requirements are met. The RPM of the crumb rollers 10 on the low speed side may range from about ½ to about 25 RPM. The high speed side crumb rollers 10 may typically range from 10 to 250 RPM. It is the speed differential between the left and right side rollers 10 in the respective stages 18, 19 and 20 in combination with the negative rake teeth which gives the excellent crumbing action.

When there is considerable heat buildup in the crumb rollers 10 in a particular tire crumbing application, the last stage 20 crumb rollers 10 may be provided with cooling means. The crumb rollers 10 may be cored out, for example, and cooled with chilled water to bring the temperature of the crumb 23 entering the final stage 20 down to about 30 degrees F. The cooling produces a better final crumbing action, and improves crumbing efficiency.

The above description applies primarily to effective crumbing of steel-belted tires. It is also contemplated that other materials may be comminuted or crumbed using the overall system of the invention. Tests are presently being conducted to determine the optimum conditions for crumbing or comminuting other materials such as "EPDM", "SBR", "VITON" (chemically resistant synthetic rubber) and silicone rubber chunks. It is presently believed that the crumbing rolls 10 will be operated within the general parameters set forth above.

Other teeth configurations may be more effective for crumbing the last-named materials. For some applications, the negative rake teeth 17 described above may be spaced at intervals around the outer periphery of the crumbing rolls 10 with an elongated ridge (not shown) filling in the intervals between the teeth 17. It is also possible that other teeth shapes may be more effective for crumbing certain materials. Teeth which are hook-shaped in profile are being considered for the crumbing of silicone rubber chunks.

This invention makes possible the efficient recycling of high volume, extremely durable materials, such as steel-belted rubber tires, which are practically non-degradable in landfills. The resulting crumb products are in high demand for reprocessing into similar, or different products. These second generation products can also be crumbed and recycled again and again, using the system of the present invention, thereby greatly reducing the loading up of over-taxed landfills, and providing a recycling economic bonus as well.

What is claimed is:

1. A crumbing machine for crumbing solid materials selected from the group consisting of rubber tires, steel-belted rubber tires, polyethylene containers, gypsum, hardboard, tin cans, glass jars and bottles comprising:

a plurality of crumb rollers, each having an outer peripheral surface and first and second ends, and having negative rake teeth of interlocking sprocket design integrally formed on the outer peripheral surface, said crumb rollers each being about 10–12 inches in diameter, about 30–40 inches long, and having about 40–72 negative rake teeth having a width of about 0.355 inches, and a negative profile angle of about 30 degrees from the radius of the corresponding crumb roller, said teeth being equally spaced in transverse rows around the outer peripheral surface of the crumb roller, said teeth being separated by transverse peripheral grooves having side surfaces and an interconnecting bottom surface, and a width of about 0.395 inches;

a first crumbing stage, adapted to receive solid material to be crumbed, comprising a pair of first and second crumb rollers disposed horizontally parallel and adjacent each other so that their respective teeth intermesh along a horizontal nip between the crumb rollers with a side clearance between the teeth of the opposing rollers of about 0.040 inches and a diametrical clearance between the teeth of one roller and the bottom surface of the corresponding groove of the opposing roller of about 0.001 to 0.250 inches;

a second crumbing stage identical to said first crumbing stage disposed parallel and below the first crumbing stage, and adapted to receive and further reduce the size of partially crumbed particles falling from the first crumbing stage;

a third crumbing stage disposed horizontally parallel to, and below the second crumbing stage, said third crumbing stare adapted to receive partially crumbed particles falling from the second stage to further reduce the size of the crumbed particles, said third stage comprising a pair of crumb rollers, also having negative rake teeth, and also being disposed horizontally adjacent to each other similar to the first and second stage pairs of crumb rollers, the teeth of the opposing rollers intermeshing at the nip between the rollers with a side clearance of about 0.025 inches, and a diametrical clearance between the teeth of one roller and the groove of the opposing roller of about 0.015 to 0.045 inches;

a first, separately adjustable drive means for rotating the first one of each pair of crumb rollers, said drive means having sufficient power to develop a torque of 100,000 to 5,000,000 pounds at the nip between the pair of crumb rollers; and a second, separately adjustable drive means for rotating the second one of each pair of crumb rollers, also capable of developing a torque of 100,000 to 5,000,000 inch pounds at the nip between the pair of crumb rollers, said first and second drive means being capable of driving the crumb rollers at a differential speed ratio in the range of 4:1 to 25:1.

2. The apparatus of claim 1, in which the negative rake teeth are about 0.375 inches wide, and the opposing grooves are about 0.415 to about 0.455 inches wide and about $\frac{1}{12}$ inches deep.

3. The apparatus of claim 1, in which the solid material to be crumbed are steel-belted tires, and the negative rake teeth of the crumb rollers of the first and second stage are about 0.375 inches wide and the opposing grooves are about 0.415 to 0.455 inches wide and $\frac{1}{12}$ inches deep; and the negative rake teeth of the crumb rollers of the third stage are about 0.310 inches wide and the opposing grooves are about 0.335 to 0.370 inches wide.

4. The apparatus of claim 1, in which each crumb roller is manufactured from a single, solid steel core, and the grooves and teeth are integrally machined on the outer peripheral surface thereof, and each crumb roller is heat treated to obtain a Rockwell hardness of 50 to 70.

5. The apparatus of claim 4, in which the crumb rollers are fabricated from high alloy and tool steels selected from the group consisting of AISI Steels #4140, 4150 and 4340.

6. The apparatus of claim 1, in which each crumbing stage comprises a high-speed crumb roller and a low-speed crumb roller disposed horizontally parallel having their teeth in intermeshing relationship, the corresponding, separately adjustable drive means for the high-speed roller is adjusted to drive the high-speed roller at a rate of 10–150 RPM, and the corresponding, separately adjustable drive means for the low-speed roller is adjusted to drive the low-speed roller at a rate of ½ to 25 RPM.

7. In a machine for crumbing steel-belted rubber tires, a crumb roller fabricated from a single solid, piece of steel, said roller having a main body with an outer, peripheral surface and first and second end portions, said crumb roller being about 10–12 inches in diameter and about 30–40 inches long, and having about 40–72 negative rake teeth in a plurality of equally spaced transverse rows around the outer peripheral surface, said teeth each having a negative profile angle of about 30 decrees from the radius of the corresponding crumb roller said teeth being separated by transverse peripheral grooves having side surfaces and an interconnecting bottom surface, said crumb roller having a Rockwell hardness of about 50–70.

8. The crumb roller of claim 7, in which the negative rake teeth have a width of about 0.355 to 0.375 inches, and the interconnecting bottom surface of the transverse peripheral grooves has a width of about 0.415 to 0.455 inches, said crumb roller being fabricated from a high alloy steel selected from the group consisting of AISI Steels #4140, 4150 and 4340, which is heat treated after fabrication to obtain a Rockwell hardness in the range of 50–70.

* * * * *